July 22, 1958 J. W. HUMPHREYS Re. 24,506

HYDRAULIC TAPPET

Original Filed Oct. 19, 1955

INVENTOR
John W. Humphreys
BY
Frank E. Liverance, Jr.
ATTORNEY

United States Patent Office

Re. 24,506

Reissued July 22, 1958

24,506

HYDRAULIC TAPPET

John W. Humphreys, Muskegon, Mich., assignor to Johnson Products, Incorporated, Muskegon, Mich., a corporation of Michigan Original No. 2,784,706, dated March 12, 1957, Serial No. 541,387, October 19, 1955. Application for reissue January 10, 1958, Serial No. 710,384

15 Claims. (Cl. 123—90)

Matter enclosed in heavy brackets [ ] appears in the original patent but forms no part of this reissue specification; matter printed in italics indicates the additions made by reissue.

This invention is directed to a novel, and very practical hydraulic tappet structure for use in internal combustion engines which, by reason of its novel structure, eliminates the need now present in substantially all hydraulic tappets of machining to very close tolerances with attendant expense. Of even more importance, an elimination is attained of measuring and sorting the tappet bodies and the plungers therewithin hydraulic tappets, in increments of 33 or 50 millionths of an inch, for assembly of matching sorted bodies and plungers in their proper sizes, to keep the leakage of oil past the plunger to a proper limited amount, thereby preventing a noisy tappet upon reaching a high temperature, and further providing a correct fit of the matching parts which assures a reasonably long life of service of the tappet.

With my invention no sorting of bodies and plungers to fit therewithin is required. The tolerances concerning the dimensions of inner bores of the bodies and outer surfaces of the plungers may be relatively large and vary from .001" to .004", which tolerances permit quantity machining within such .003" variation in fitting. The relatively wide tolerances over what is now required in machining, and the elimination of measuring each body and each plunger and of sorting and fitting greatly reduces the cost of manufacture to an extent reaching approximately ten percent of the total cost of the tappet.

An understanding of the novel structure embodying my invention in its preferred form may be understood from the following description, taken in connection with the accompanying drawing, in which, Fig. 1 is an upper end or plan view of the hydraulic tappet.

Like reference characters refer to like parts in the different figures of the drawing.

Figure 1:
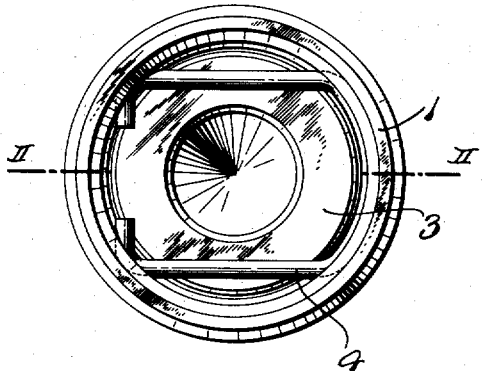
Figure 3:
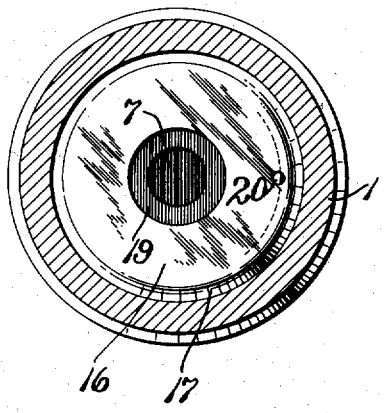
Fig. 3 is a transverse horizontal section substantially on the plane of line III—III of Fig. 2.

In the construction illustrated the usual tappet body 1 of cylindrical form is bored downwardly from its upper end toward but short of the lower end which is closed, the under side of the lower end in use bearing against a cam on a camshaft of an internal combusion engine.

The plunger in the present invention includes an inner lower part 2 and an outer upper part 3 above it, the lower part being inserted into the bore of the body and having a relatively loose fit as compared to the usual hydraulic tappet fit in which the tolerances are as above stated. The upper body part 3 can be even still looser without materially affecting the operation, although in actual practice it is fitted about the same as the lower part 2.

Such plunger is normally retained within the body against moving out and disconnecting therefrom by a spring retainer 4 above the upper end of the upper part 3 which snaps into an annular groove 5 at the inner side of the walls of the tappet body 1, in the usual much used way that the plungers of hydraulic tappets when assembled are thus kept from separation in packing, handling and shipping.

The inner and lower member 2 of the plunger is interiorly bored from its upper end downwardly to provide an oil supply chamber 6 which has an outlet through a reduced lower end passage 7 from the lower end of the chamber 6 to the lower end of a projecting nipple 8 at the lower end of the member 2. Such passage is normally closed by a flat, thin metal disk valve 9 held against the lower end of the nipple 8 by a light strength coiled compression spring 10 within a cage 11 which has an opening at its lower end and through its side. The cage comes against the lower side of the member 2 at the upper end of the cage and is held snugly in position by a coiled compression spring 12 of much heavier strength than the spring 10, seated at its lower end against the bottom of the tappet bore. The chamber 13 below the plunger member 2, in which the valve spring and cage are located, is the pressure chamber of the hydraulic tappet. Such valve structure, including the disk valve, springs 10 and 12 and the cage 11, is old and well known and has been used in hydraulic tappets for a considerable time.

Figure 2:
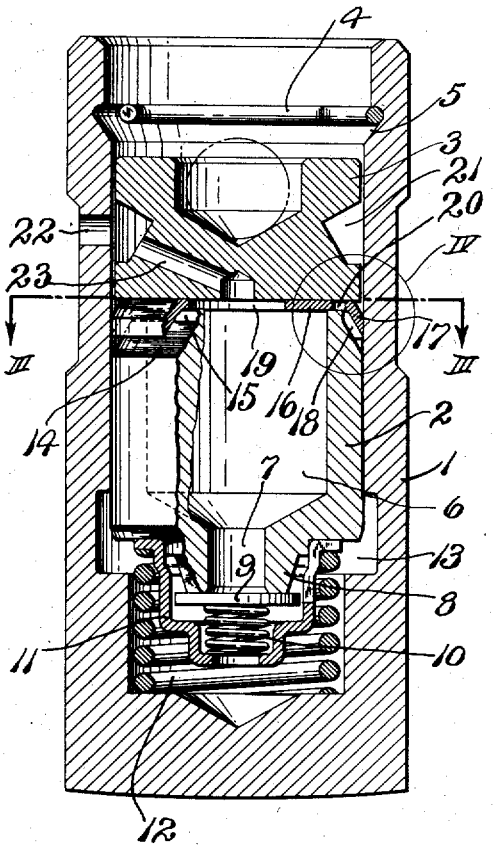
Fig. 2 is a central longitudinal vertical section therethrough on the plane of line II—II of Fig. 1.
Figure 4:
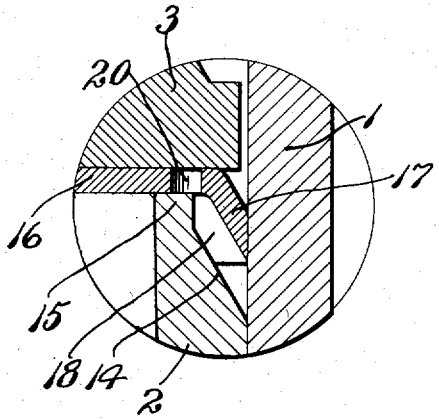
Fig. 4 is an enlarged fragmentary vertical section on the same plane as Fig. 2, a fragmentary portion, such as within the indicated circle IV, being shown enlarged.

At the upper end of the lower plunger member 2 a portion is cut away around the outer side thereof making an annular upwardly and inwardly inclined surface 14, the member 2 at its upper end terminating in a narrowed annular lip 15 as shown in Figs. 2 and 4.

Between the upper end of the member 2 and the lower end of plunger member 3 a thin metallic disk 16 is placed having a downwardly and outwardly inclined annular flange 17. The peripheral edges of said flange come against the inner sides of the walls of the tappet body and are located outwardly from the annular surface 14 of the member 2 a distance so that, as best shown in Fig. 4, an annular chamber 18 is made which may be filled with oil or other hydraulic liquid used, forced upwardly from the pressure chamber 13 between the lower member 2 and the walls of the body 1 to the chamber 18.

Preferably at the center of the disk 16 a circular opening 19 is made. Also adjacent an edge of the disk 16 and inwardly from its integral junction with the flange 17 a small opening 20 is pierced which is disposed so that, at its lower end, it is in partial communication with the chamber 18, the major portion of the lower end of the opening or passage 20 being over the annular rim or lip 15 of the lower plunger member 2. Such small pierced hole in practice projects over the edge of the upper annular rim 15 of the member 2 in an amount which may vary from .002" to .005". As an equivalent the same effects and results may be obtained by making a small hole, the area of which would be substantially that of the connecting passage between chamber 18 and the opening 20, through the flange 17. This however, because of the smallness of the hole made through the flange 17 would be a very difficult and expensive operation and one not practical for high quantity production. The diameter of hole 20 is somewhat greater than the thickness of the disk, making it practical to pierce the hole during the fabrication of the disk.

An annular oil receiving groove 21 is made around the upper plunger member 3. It receives oil from the lubricating system of an internal combustion engine in the usual manner of all hydraulic tappets through the passage 22 in the body 1 being in registration with the groove 21. From such groove 21 oil flows through a passage 23 leading to and over the opening 19 in the thin stamped disk 16. All that is necessary is that there shall be this free communication for flow of oil passing through the inlet at 22 so as to reach the oil supply chamber 6 of the tappet. Thus while the opening 19 is preferably centrally disposed it is not necessarily so.

With the structure as described the operation of the tappets is the same as with all hydraulic tappets except the metered movement of oil from the pressure chamber upward between the piston plunger and the walls of the body 1 is not controlled by a sorted and selected assembly of the tappet bodies and tappet plungers held within limits considerably less than one-tenth of one-thousandths of an inch. But the oil under the pressure to which the oil in the chamber 13 is subjected may flow much more freely upward and fill the annular chamber 18 and then is restricted, or metered, in its flow through the narrowed small area connection between such chamber 18 and the opening 20 to come against the under side of the upper plunger member 3. The flange 17 riding against the walls of the tappet body substantially prevents flow of oil from the chamber 18 around the outer edges of said annular flange 17 in an upward direction.

The lower side of the upper plunger member 3 is machined flat so as to lie snugly against the upper side of the thin metal disk member 16. When on the down stroke of the tappet with the engine valve moving toward closed position, such valve reaches its closed position and the force of the engine valve spring is, for a very short, practically instantaneous time, removed from the upper member 3, the pressure of oil within the chamber 18 transmitted through the opening 20 against the under side of the upper member 3 will, for an instant, lift such member 3. This permits a small or meter quantity of oil to pass between the upper plunger member 3 and the disk 16 in the required amount of leakage necessary for the operation of hydraulic tappets; which, heretofore, has been the leakage from the pressure chamber 13, in very small amounts, because of the close fit of the plunger in the tappet body, only a very small or metered amount passing between such tappet body walls and the plunger.

In the practical operations and tests of the tappet it has been found that while the use of the opening at 20 through the disk 16 with the very small area communication between it and the annular chamber 18 is the most desirable structure from a practical standpoint, both in manufacture and use, the tappet still is operative, though perhaps with a less measure of success, if the hole 20 is eliminated and the edges of the flanges 17 merely rounded or at least reduced in contacting area below that shown in Fig. 4 so that a small and metered quantity of oil will pass between the bearing edges of said flanges and the walls of the tappet body against which they ride. My invention, while disclosed in the best form known to me, is not to be limited other than as required by the claims appended hereto which define the invention.

I claim:

1. A hydraulic tappet plunger adapted to be assembled within a tappet body comprising, a lower plunger member having a liquid supply chamber, open at its upper end, and a valve controlled outlet at its lower end, a thin metal disk over the upper open end of said member having edge portions adapted to bear against the inner sides of the walls of a tappet body in which said plunger is installed, and an upper plunger member having a flat lower side against the upper side of said disk.

2. Structure as defined in claim 1, said disk at its peripheral edge portions having a downwardly and outwardly extending annular flange integral therewith.

3. A hydraulic tappet plunger for assembly within a tappet body comprising, upper and lower plunger members, and a thin metal disk between adjacent ends of said members, the peripheral edges of which extend slightly beyond the outer sides of said members, the lower member having a liquid receiving chamber open at the upper end of said lower member and having a valve controlled outlet at the lower end thereof, said disk being located over the upper open end of said chamber, said disk having an opening therethrough at the upper end of said chamber, and said upper member having a liquid carrying passage from its outer side to and in conjunction with said opening in said disk.

4. In a hydraulic tappet having an elongated, interiorly bored body closed at its lower end and open at the upper end, the improvement comprising, a plunger within the body having a lower member normally spring forced outwardly, an upper member aligned with said lower member, a thin disk between said members having peripheral edges in contact engagement with said body, said members and disk having passages therethrough in conjunction with each other for liquid passage, and said lower member having a valve normally closing the passage therethrough at the lower end thereof.

5. A hydraulic tappet having the elements in combination defined in claim 4, said disk at its peripheral portions having an annular flange inclined to the plane of said disk toward the closed end of said body, and said lower plunger member at its outer end portion having a reduced exterior diameter, thereby providing an annular chamber between said flange and the outer end of said lower plunger member.

6. A hydraulic tappet plunger comprising, upper and lower plunger members, a thin disk between adjacent ends of said members, said disk at its peripheral portions having a downwardly and outwardly inclined annular flange, and the adjacent upper end portion of said lower plunger member being reduced in diameter thereby providing an annular chamber between said flange and upper end of said lower plunger member, said disk having an opening therethrough in conjunction with said annular chamber.

7. Structure as defined in claim 6, said opening in said disk being located partly over the upper end of said lower plunger member, and partly over said chamber.

*8. A hydraulic tappet comprising; a hollow tappet body member closed at one end, a plunger member slidably disposed within said hollow tappet body member and forming a pressure chamber space with the closed end thereof, said plunger member having two parts in end aligned relation and a reservoir chamber space provided therebetween, check valve means provided between said pressure and reservoir chamber spaces for communication from said reservoir to said pressure chamber, and control means provided between said plunger member parts for separating said parts only in response to fluid pressure conditions within said pressure chamber space for venting said pressure chamber space to said reservoir.*

*9. A hydraulic tappet comprising; a hollow tappet body member closed at one end, a plunger member slidably disposed within said hollow tappet body member and forming a pressure chamber space with the closed end thereof, said plunger member including two parts in end aligned relation and having a reservoir chamber space provided therebetween, check valve means provided between said pressure and reservoir chamber spaces for communication from said reservoir to said pressure chamber, and control means disposed between the adjacently disposed ends of said plunger member parts for closing said pressure chamber space from said reservoir chamber space except under certain pressure conditions within said pressure chamber space.*

*10. A hydraulic tappet comprising; a hollow tappet body member closed at one end, a plunger member slidably disposed within said hollow tappet body member and forming a pressure chamber space therewith, said plunger member including two separate parts disposed in end engaging relation within said tappet body and having a reservoir chamber space provided therebetween, check valve means provided through one of said plunger parts for communication from said reservoir to said*

*pressure chamber, and valve means provided between the adjacently disposed ends of said plunger parts and separating said pressure chamber space from said reservoir chamber space, said valve means being responsive to pressure conditions within said pressure chamber space for venting said pressure chamber space to said reservoir chamber space.*

*11. A hydraulic tappet comprising; a hollow tappet body member closed at one end, a plunger member slidably disposed within said hollow tappet body member and forming a pressure chamber space therewith, said plunger member including two separate parts disposed in end engaging relation within said tappet body and having a reservoir chamber space provided therebetween, check valve means provided through one of said plunger parts for communication from said reservoir to said pressure chamber, and annular control surfaces provided by the adjacently disposed ends of said plunger member parts, said surfaces being normally closed to prevent communication from said pressure chamber space to said reservoir chamber space and being responsive to pressure conditions within said pressure chamber space for separating and venting said pressure chamber to said reservoir.*

*12. A hydraulic tappet comprising; a hollow tappet body closed at one end and having a plunger member slidably disposed therein, said plunger member separating said hollow tappet body into a pressure chamber and a reservoir chamber, check valve means within said plunger providing for communication from said reservoir to said pressure chamber, an annular pressure chamber space provided about said plunger near the upper end thereof and in communication with said pressure chamber, and valve means provided through said plunger member between said pressure chamber space and said reservoir chamber, said valve means being responsive to pressure conditions within said space for venting said space to said reservoir and otherwise preventing communication therebetween.*

*13. A hydraulic tappet comprising; a blind end hollow tappet body member having a plunger member slidably disposed therein and forming a pressure chamber at the blind end thereof, said plunger member including two separate parts in end engaging relation and having a reservoir chamber formed therein and between said parts, check valve means providing communication from said reservoir to said pressure chamber, an annular pressure chamber space provided about said plunger member adjacent the juncture of said parts and in constant restricted communication with said pressure chamber, said pressure chamber space being in communication with an end surface of the plunger part nearest the open end of said tappet body and being adapted to maintain a fluid pressure condition built up therein during the operation of said tappet for subsequently separating said plunger parts and venting said pressure chamber space to said reservoir chamber therebetween.*

*14. A hydraulic tappet comprising; a blind end hollow tappet body member having a plunger member slidably disposed therein and forming a pressure chamber at the blind end thereof, said plunger member including two separate parts in end engaging relation and having a reservoir chamber formed therein and between said parts, check valve means providing communication from said reservoir to said pressure chamber, an annular pressure chamber space provided about said plunger member adjacent the juncture of said parts and in open metered communication with said pressure chamber, said pressure chamber space being in communication with an end surface of the plunger part nearest the open end of said tappet body and being adapted to maintain a fluid pressure condition built up therein during the operation of said tappet for subsequently separating said plunger parts and venting said pressure chamber space to said reservoir chamber therebetween.*

*15. A hydraulic tappet comprising; a blind end hollow tappet body member having a plunger member slidably disposed therein and forming a pressure chamber at the blind end thereof, said plunger member including two separate parts in end engaging relation and having a reservoir chamber formed therein and between said parts, check valve means providing communication from said reservoir to said pressure chamber, an annular pressure chamber space provided about said plunger member adjacent the juncture of said parts and in open metered communication with said pressure chamber, valve means disposed between said plunger parts and normally preventing communication between said pressure and reservoir chambers, said valve means being in open communication with said pressure chamber space and responsive to the pressure condition built up therein during the operation of said tappet for subsequently venting said space to said reservoir between said plunger parts.*

References Cited in the file of this patent or the original patent

UNITED STATES PATENTS 2,688,319 Humphreys ---------- Sept. 7, 1954